O. C. BJORNEBY & A. MIDGARDEN.
COMBINED FRICTION TENSION AND BRAKE FOR MOTOR CYCLES.
APPLICATION FILED DEC. 21, 1915.
1,237,743.
Patented Aug. 21, 1917.
2 SHEETS—SHEET 2.
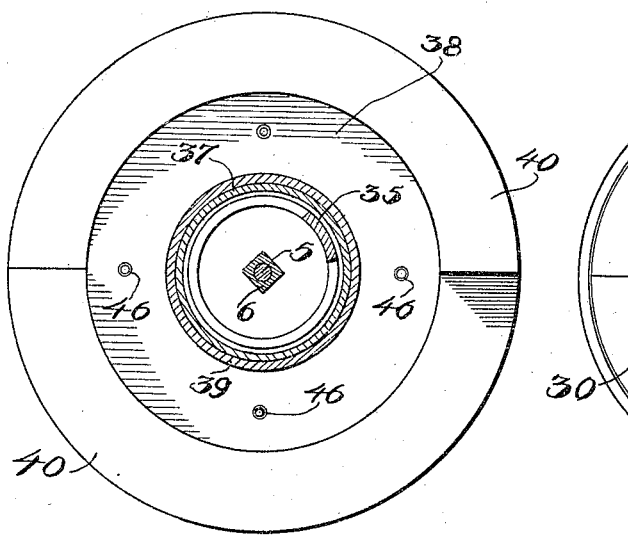
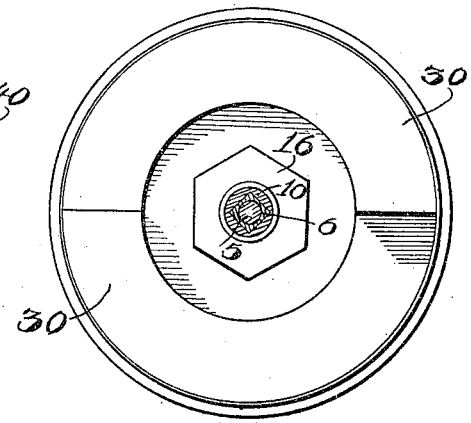
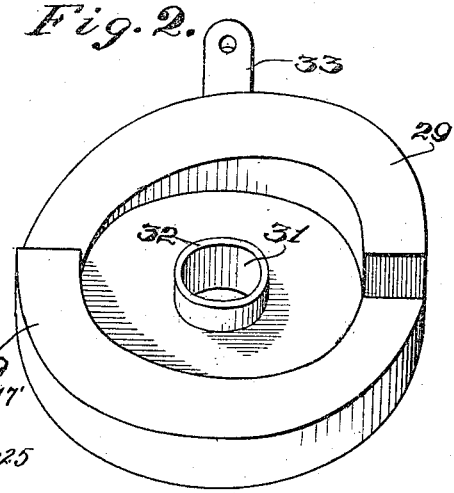
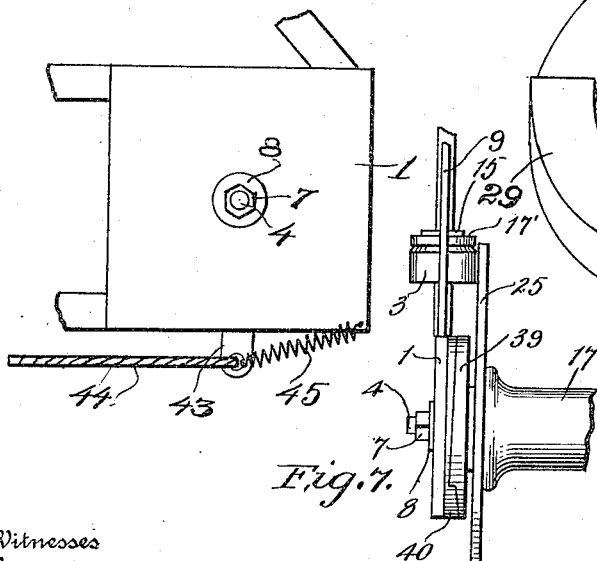
Witnesses
Ernest A. Pulham.
H. J. Riley.
Inventors
O. C. Bjorneby
A. Midgarden.
By
Attorney

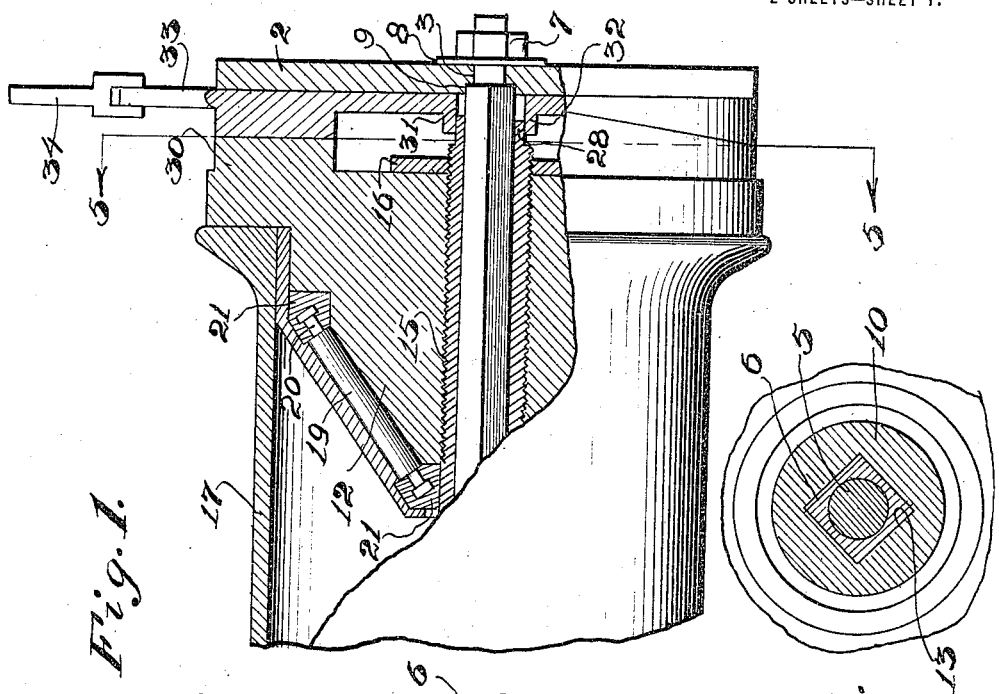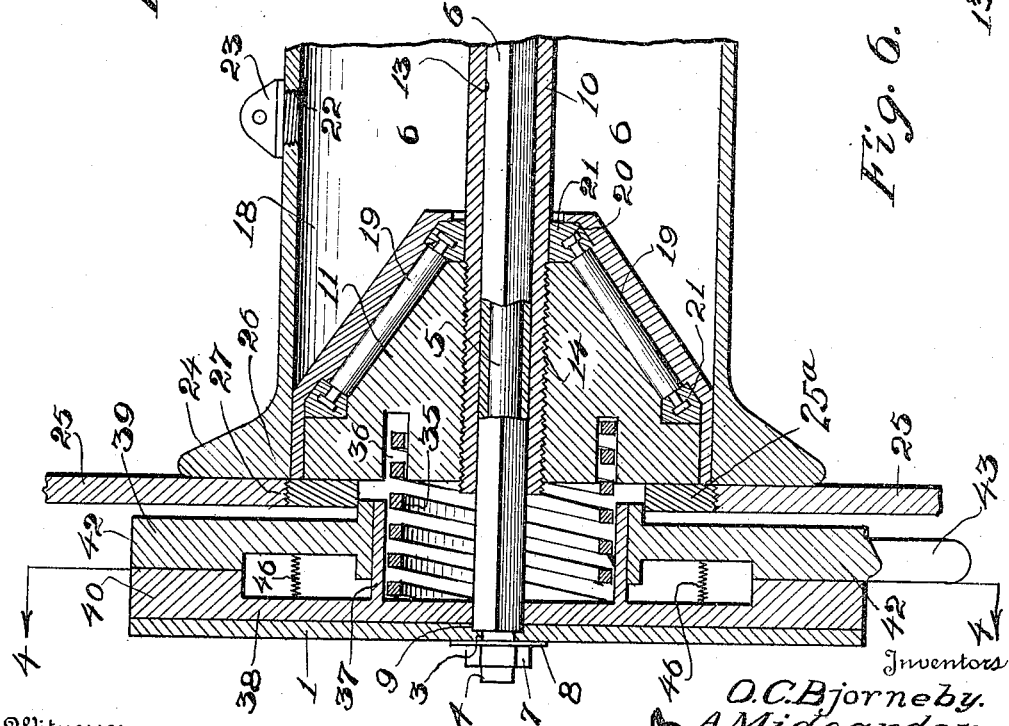

UNITED STATES PATENT OFFICE.

OLIVER C. BJORNEBY AND AMUND MIDGARDEN, OF HOOPLE, NORTH DAKOTA.

COMBINED FRICTION TENSION AND BRAKE FOR MOTOR-CYCLES.

1,237,743.  Specification of Letters Patent.  Patented Aug. 21, 1917.

Application filed December 21, 1915. Serial No. 68,057.

*To all whom it may concern:*

Be it known that we, OLIVER C. BJORNEBY and AMUND MIDGARDEN, citizens of the United States, residing at Hoople, in the county of Walsh and State of North Dakota, have invented certain new and useful Improvements in Combined Friction Tensions and Brakes for Motor-Cycles; and we do hereby declare the following to be a full, clear, and exact description of the invention, such as will enable others skilled in the art to which it appertains to make and use the same.

The invention relates to a combined friction tension and brake for motorcycles.

The object of the present invention is to provide a simple, practical and comparatively inexpensive construction adapted to be readily applied to motorcycles and designed for use in connection with friction drives, more especially that shown and described in Patent 1,185,616 granted to us June 6, 1916, and adapted to be readily operated for engaging a friction disk or analogous motion transmission element with the desired force so that a motorcycle may be stopped and started as slowly as desired without stopping the rotation of the friction disk.

A further object of the invention is to provide a combined friction tension and brake adapted to be operated independently and adapted to coact to disconnect the driving wheel from the driving element and enable the brake to be applied to the driving wheel whereby greater control of a motorcycle is obtained and the safety of such riding materially increased.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings—

Figure 1 is an enlarged vertical sectional view through the hub of the driving wheel, the section being taken longitudinally of the hub, Fig. 2 is a perspective view of the movable member of the friction drive, Fig. 3 is a detail side view showing one of the frame plates and a portion of the brake operating mechanism, Fig. 4 is a transverse sectional view on the line 4—4 of Fig. 1.

Fig. 5 is a sectional view on the line 5—5 of Fig. 1.

Fig. 6 is a detail sectional view illustrating the manner of mounting the slidable sleeve.

Fig. 7 is a detail plan illustrating the arrangement of the coacting gear elements of the friction drive.

Like numerals of reference designate corresponding parts in all the figures of the drawings.

In the accompanying drawing in which is illustrated the preferred embodiment of the invention, 1 and 2 designate frame plates of preferably rectangular form as illustrated in Fig. 3 of the accompanying drawings and suitably connected with the frame of the motorcycle which may be of any desired construction. These frame plates are provided with central circular openings 3 for the reception of threaded terminals 4 of a rod 5 which supports an axle sleeve or body 6. The rod is secured in the openings of the frame plates by nuts 7, washers 8 being preferably interposed between the nuts and the frame plates. Any suitable means may be employed for locking the nuts on the ends of the rods. The axle sleeve or body which is squared may of course be of any other polygonal form and its ends are fitted in rectangular sockets 9 formed in the inner faces of the frame plates whereby the axle sleeve or body is rigidly interlocked with the frame of the motorcycle to form a support for a non-rotary longitudinally slidable or adjustable sleeve 10 upon which are mounted cones 11 and 12. The slidable sleeve which is held against rotary movement by the inner sleeve or body of the axle has a rectangular opening 13 to receive the same and the ends 14 and 15 of the slidable sleeve are exteriorly threaded to receive the cones 11 and 12 which are interiorly threaded to screw on the slidable sleeve but one of the cones may be formed integral with the sleeve and the other threaded as will be readily understood. The cone 11 may be permanently locked on the slidable sleeve in any suitable manner and the other cone 12 is preferably detachably secured on the sleeve by means of a lock nut 16 which engages the threaded end 15 of the sleeve as clearly shown in Fig. 1 of the drawings. This will enable the hub 17 of the driving wheel to be readily placed on and removed from the sleeve 10.

The hub which is in the form of a hollow shell to provide a lubricant chamber 18 is supported by the cone, roller bearings 19 being preferably provided. The inner and outer ends 20 of the anti-friction rollers are arranged in sectional bearings 21 which enable the parts to be readily assembled but as the sectional bearings and the particular construction of the roller bearings do not constitute a portion of the present invention, specific description and illustration thereof are deemed unnecessary. The hollow hub is provided with a filling opening 22 having a suitable closure plug 23 and suitable apertures are provided for supplying the bearings with the lubricant.

Bolted or otherwise secured to one of the flanges 24 of the hub is a friction disk 25 constituting an element of the friction drive of the aforesaid patent, and coacting with a friction pinion 25ª and provided with a removable section 26 having a threaded connection at 27 with the body of the friction disk and adapted to be removed to permit the assembling of the parts without unbolting and removing the friction disk. The hub, the cones, the connecting sliding sleeve and the friction disk 25 are held at the limit of their movement toward the right hand end of the axle in Fig. 1 of the drawings by a coiled spring to maintain the friction disk out of engagement with a co-acting friction pinion, not shown and the friction disk is forced into engagement with the friction pinion by a rotary friction tension disk or member mounted on the right hand end 28 of the sliding sleeve and capable of a limited rotary movement to engage a plurality of cams 29 with coacting cams 30 of the adjacent cone 12 whereby the wheel and the friction disks are moved longitudinal of the axle to cause an engagement of the friction elements of the driving mechanism.

The sliding sleeve is provided at the end 28 with a bowed extension and the movable friction tension disk which is capable of a limited rotary movement is provided with a central opening 31 and it has a sleeve or hub portion 32 of cylindrical form to slidably fit the extension 28 of the sleeve 10. The movable friction tension disk or member is interposed between the frame plate 2 and the cone 12 and it is adapted to force the cone 12 and the structure with which it is connected away from the frame plate 2 in the direction of the frame plate 1 to cause the friction disks to mesh or engage. The movable friction member is provided with an exterior projection 33 with which is connected an operating rod 34 or other suitable connection for actuating the friction tension disk or member in either direction. While the projection is shown integral with the movable friction tension disk or member it may constitute a portion of a band or ring and be adjustably mounted on the disk or member to provide for an adjustment of the operating means but any other form of adjustment may of course be employed.

The hub is actuated by the friction tension device against the action of a coiled spring 35 which engages the cone 11 preferably in a groove 36 thereof, the groove being formed in the cone for the purpose of enabling a spring of relatively great power to be employed so that the friction disk 25 will be automatically carried out of engagement with the driving element when the driving wheel is released by the friction tension. The friction pinion which is shown in the aforesaid patent limits the movement of the friction disk 25 and the hub so that the movement of the hub to the left will not carry the friction disk into engagement with the brake mechanism hereinafter described. The driving wheel is slightly out of alinement with the front wheel of the motorcycle when the friction disk is out of mesh with the friction pinion and the lateral movement of the driving wheel to carry the friction disk into mesh with the friction pinion alines the driving wheel with the front wheel of the motorcycle. The outer portion of the coiled spring 35 is arranged within a cylindrical extension or sleeve 37 formed integral with a fixed brake disk 38 and constituting a support for a movable brake disk 39. The fixed brake disk 38 is bolted or otherwise secured to the inner face of the frame plate 1 and it is provided with cams 40 located at the inner face of the brake disk and cooperating with cams 42 of the movable brake disk or member and the latter is interposed between the friction disk 25 and the stationary brake disk or member so that the partial rotary movement of the brake disk or member 39 is adapted to cause a gripping or frictional engagement of the contiguous part for stopping the rotary movement of the driving wheel. The movable brake disk 39 is provided with a projection 43 which may be either adjustably mounted on the brake disk or member or be formed integral therewith and it is connected with an operating cable 44 and a retractile spring 45. Any suitable operating mechanism may be connected with the cable 44 for actuating the movable brake disk in one direction and the spring 45 will return the brake disk to its initial position. The movable brake disk is maintained normally out of engagement with the friction disk by coiled springs 46 connected with the stationary brake disk 38 and with the movable brake disk 39 and located in an intervening space formed by the coacting cams. The springs 46 are arranged between the annular flange or extension 37 and the cam as clearly illustrated in Fig. 1 of the drawings. The coacting faces of the brake element may be constructed of fiber or any other suitable material to enable a firm gripping or frictional engagement to be obtained.

Any number of cams may be employed on the coacting disks or members for operating the brake or the friction tension device and the cams of the cones 12 may be formed integral therewith as shown or they may be in the form of a separate disk.

What is claimed is:—

1. In a device of the class described, the combination with a laterally movable motorcycle wheel provided at one side with a gear element, means for normally urging the wheel in one direction for carrying the gear element out of mesh and means located at the opposite side of the wheel for forcing the same in the opposite direction to carry the gear element into mesh.

2. In a device of the class described, the combination with a motorcycle wheel having a limited lateral movement of a friction gear element carried by the wheel, a spring for urging the wheel in one direction to maintain the friction gear element normally out of engagement with a coacting gear element and means located at the other side of the wheel for positively forcing the same in the opposite direction.

3. In a device of the class described, the combination with a motorcycle wheel having a limited lateral movement of a friction gear element carried by the wheel, a spring for urging the wheel in one direction to maintain the friction gear element normally out of engagement with a coacting gear element and means including a cam element for forcing the wheel in the opposite direction.

4. In a device of the class described, the combination with a motorcycle wheel having a limited lateral movement of a friction gear element carried by the wheel, a spring for urging the wheel in one direction to maintain the friction gear element normally out of engagement wth a coacting gear element, and means including coacting cam elements, one of the cam elements sliding with the wheel and the other having a relative rotary movement.

5. A device of the class described including spaced cones, longitudinally slidable means for connecting the cones, a motorcycle wheel supported by the said cones, a friction disk carried by the said wheel and adapted to be moved into and out of mesh with a coacting gear, means for yieldably urging the friction disk out of engagement and means for moving the same into engagement, the latter means including a cam carried by one of the cones and a movable member having a coacting cam for engaging the said cam.

6. A device of the class described including spaced cones, longitudinally slidable means for connecting the cones, a motorcycle wheel supported by the said cones, a friction disk carried by the said wheel and adapted to be moved into and out of mesh with a coacting gear, means for yieldably urging the friction disk out of engagement and means for moving the same into engagement, the latter means including a cam carried by one of the said cones and a friction tension member mounted on the axis of the wheel and having a cam coacting with the said cam.

7. A device of the class described including a fixed polygonal axle, a longitudinally slidable sleeve arranged on and interlocked with the polygonal axle, cones mounted on the said sleeve, a gear element carried by the wheel, yieldable means for urging the wheel in one direction and means for positively moving the same in the opposite direction.

8. A device of the class described including a relatively fixed axle, a member slidably interlocked with the axle, bearings mounted on the said member, a wheel supported by the said bearings, a gear element carried by the wheel, a spring for urging the wheel in one direction to hold the gear element normally out of mesh and means for positively moving the gear element in the opposite direction.

9. A device of the class described including a frame having spaced portions provided with openings and having sockets at the inner ends of the openings, a hollow polygonal axle fitted in the sockets and interlocked with the frame, a rod extending through the axle and the frame and provided with fastening means, a sleeve slidably interlocked with the axle, spaced cones mounted on the sleeve, one of the cones being provided with a cam, a wheel supported by the cones and a rotary friction disk mounted on the axle and provided with a cam coacting with the cam of the cone.

10. A device of the class described including a frame having spaced portions provided with openings and having sockets at the inner ends of the openings, a hollow polygonal axle fitted in the sockets and interlocked with the frame, a rod extending through the axle and the frame and provided with fastening means, a sleeve slidably interlocked with the axle, spaced cones mounted on the sleeve, one of the cones being provided with a cam, a wheel supported by the cones, and a friction tension disk having an opening to receive the axle and provided with a sleeve or extension arranged on the said axle, said friction tension disk being provided with a cam coacting with the cam of the cone.

11. A device of the class described including a wheel having a friction disk, a relatively fixed brake disk having a cam, and a relatively movable brake disk also provided with a cam to coact with the said cam whereby it is forced into engagement with the friction disk.

12. A device of the class described including a laterally movable wheel having a friction disk, a relatively fixed brake disk provided with a cam and a relatively movable brake disk having a coacting cam to engage the said cam whereby the movable brake disk is forced into engagement with the friction disk.

13. A device of the class described including a laterally movable wheel having a friction disk, a relatively fixed brake disk provided with a cam, and having an annular flange or extension, a relatively rotary brake disk mounted on the flange or extension and having a cam to coöperate with the said cam whereby the movable brake disk is forced into engagement with the friction disk.

14. A device of the class described including a laterally movable wheel having a friction disk, a relatively fixed brake disk provided with a cam, and having an annular flange or extension, a relatively rotary brake disk mounted on the flange or extension and having a cam to coöperate with the said cam whereby the movable brake disk is forced into engagement with the friction disk and a spring for normally urging the wheel and the friction disk away from the brake disks.

15. A device of the class described including a laterally movable wheel provided at one side with a friction disk, fixed and movable brake disks provided with coacting cams, the movable brake disk being adapted to be forced into engagement with the friction disk by the said cam, springs for connecting the brake disks for urging the movable brake disks away from the friction disk, a spring for urging the laterally movable wheel away from the brake disks and means located at the opposite side of the wheel for forcing the latter toward the said brake disks.

16. A device of the class described including spaced cones, a relatively slidable member connecting the cones, a wheel having a hub mounted on the said cones and a friction disk secured to the said wheel and provided with a removable section located at one of the cones and adapted to permit the parts to be assembled without removing the friction disk.

In testimony whereof we affix our signatures in presence of two witnesses.

OLIVER C. BJORNEBY.
AMUND MIDGARDEN.

Witnesses:
R. H. RINDE,
N. C. OLSON.

Copies of this patent may be obtained for five cents each, by addressing the "Commissioner of Patents, Washington, D. C."